United States Patent [19]

Wang

[11] Patent Number: 4,724,631

[45] Date of Patent: Feb. 16, 1988

[54] MOBILE FISH NET BUOY TOP

[76] Inventor: Yuan-Kai Wang, No. 121-5, Chung Chen Lane, Chyan Chen District, Kaohsiung City, Taiwan

[21] Appl. No.: 947,757

[22] Filed: Dec. 29, 1986

[51] Int. Cl.⁴ ............................................. A01K 97/00
[52] U.S. Cl. ....................................................... 43/55
[58] Field of Search ............................................. 43/55

[56] References Cited

U.S. PATENT DOCUMENTS

| | | | |
|---|---|---|---|
| 1,841,956 | 1/1932 | Juergens | 43/55 |
| 2,241,314 | 5/1941 | Mohler | 43/55 |
| 3,381,408 | 5/1968 | Nishimura | 43/55 |
| 3,524,278 | 8/1970 | Wolfe | 43/55 |
| 3,919,803 | 11/1975 | Manguso | 43/55 |
| 4,570,374 | 2/1986 | Baxley | 43/55 |

*Primary Examiner*—Gene P. Crosby
*Attorney, Agent, or Firm*—Browdy and Neimark

[57] ABSTRACT

A movable fish net buoy top, having the framework of a buoy top in association with a grid port which can be drawn up by 105 degrees, and pushed down by 75 degrees, so structured that as the top is laid on the surface of water the grid port on either side thereof will, owing to water buoyancy, be pushed up in bearing against a mortise joint catch furnished on top of the strut. When the buoy top is taken off the water surface, a mortise joint catch furnished at the bottom of the strut is deflected by 90 degrees, so as to prevent the grid port from moving downward toward either side due to gravitation, thereby preventing it from opening. To pour out the catch entrapped in the fish net, the mortise joint on top of the buoy top is turned to a setting in parallel with the surface level of the framework, and reverse the framework of the buoy top, so as to bring the grid port to open downwards along either side, so that the catch can be poured out, conveniently and effectively.

1 Claim, 9 Drawing Figures

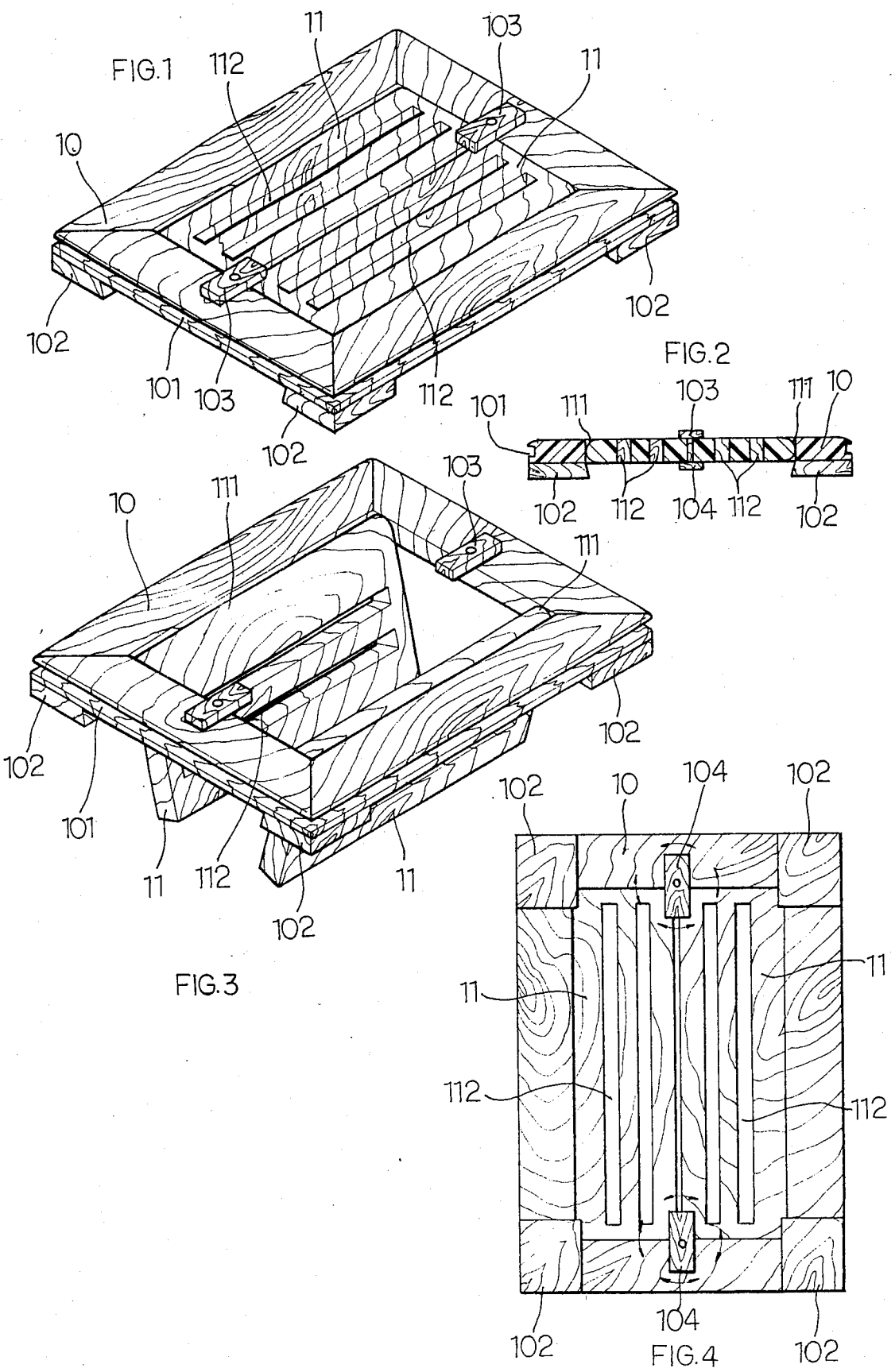

MOBILE FISH NET BUOY TOP

BACKGROUND OF THE INVENTION

The present invention relates to the structure of a movable fish net buoy top, which comprises a framework of a buoy top incorporating a grid port which can be drawn up by 105 degrees, down by 75 degrees, and the grid port being completed with a plurality of seepage holes oblong in formation. A mortise joint catch is provided on both the top and the bottom of the framework of the buoy top, so that, as the buoy top is laid flat on top of the water surface, the grid port on both sides will bear up curvilinearly at the same time, owing to buoyance against the mortise joint catch furnished on top of the strut, and by virtue of the discharging function due to the presence of the oblong seepage holes on the grid port. To take the buoy top off the surface, the mortise joint catch at the bottom of the framework is simply turned by 90 degrees, so as to prevent the grid port from drooping down toward both sides, to open up, owing to gravitation. To pour out the catch of fish entrapped therein, the mortise joint catch, disposed on top of the buoy top, is simply turned parallel with the surface level of the framework, reverse the buoy top, so as to bring the grid port on both sides to droop to open, whereupon the catch may be poured out for subsequent disposition.

In our times, fishing has already become a popular pastime, and apart from such fishing tools as fishing pole and bait, a fish net for provisional custody of the catch is also indispensable for fishing. Conventionally the structure of a fish net is composed of a hoop made of rubber rings. Such a structure, however, has to be supported for hanging submerged in the water, when put to service, least it should go down to the bottom of the water. In addition, a retractable rope is used to secure the opening gap of the net, so as to prevent the catch within from fleeing out. The pity, however, is that with such a device the fisher will have to open the opening gap of the fish net with both hands when he catches a fish by the fishpole, in order to put the fish into the fish net for custody. In the meantime, it often happens that the fish, on the point of striving for escape from the entrapping hands, may slip thereoff, and flee at large.

Accordingly, in view of the disadvantages found with the use of conventional fish nets such as those recited in the foregoing, the inventor undertook to work for improvement of the conventional fish nets, and eventually succeeded in the presentation of an improved fish net top opening design which makes possible best utilization of fish net structures.

SUMMARY OF THE INVENTION

Accordingly, a prime object of the present invention is to provide a movable fish net buoy top frame structure, to both sides of which there is provided a grid port which is deflectable by 105 degrees upwards and by 75 degrees downwards, and which effects the closure/opening access performance by means of flotation present and prevailing as long as the invention fish net is entirely submerged in water, in other words, to provide an easy to operate, easy to carry, mobile fish net buoy top for fishers.

A further object of the present invention is to provide the structure of a movable fish net buoy top, of which both the grid ports on either side thereto are transmitted by the flotation, prevailing as long as the invention device is submerged, floating, in water, to close up or else open, to accommodate the disposal of the catch into the fish net. When the fisher catches a fish somehow, the movable fish net buoy top can be employed without using both hands which would otherwise be employed, thereby helping to prevent the catch being brought in from slipping out of hand, back into the water.

A further object, still, lies in the presentation of a movable fish net buoy top, of which a grid port associated with the framework of the bouy top from within may flare upwards so that the buoy top, if disposed upside down, may facilitate opening of the grid port drooping on both sides, so that the catch may come out smoothly and conveniently, without the fish's dorsal fin or chest fin being caught by the fish net.

Other features and advantages of the present invention will emerge from the following descriptions of embodiments given by way of illustration, but not in any way limiting, with reference to the accompanying drawings in which:

BRIEF DESCRIPTION OF DRAWINGS

FIG. 1 is a front view of an embodiment of the device of the invention;

FIG. 2 is a cross-section view of the device of the invention as seen on a level plane;

FIG. 3 is a three-dimensional perspective of the invention device whereof the grid port droops in a pendent setting;

FIG. 4 is a back view of the invention device;

DESCRIPTION OF THE PREFERRED EMBODIMENT

Figures 5, 7:
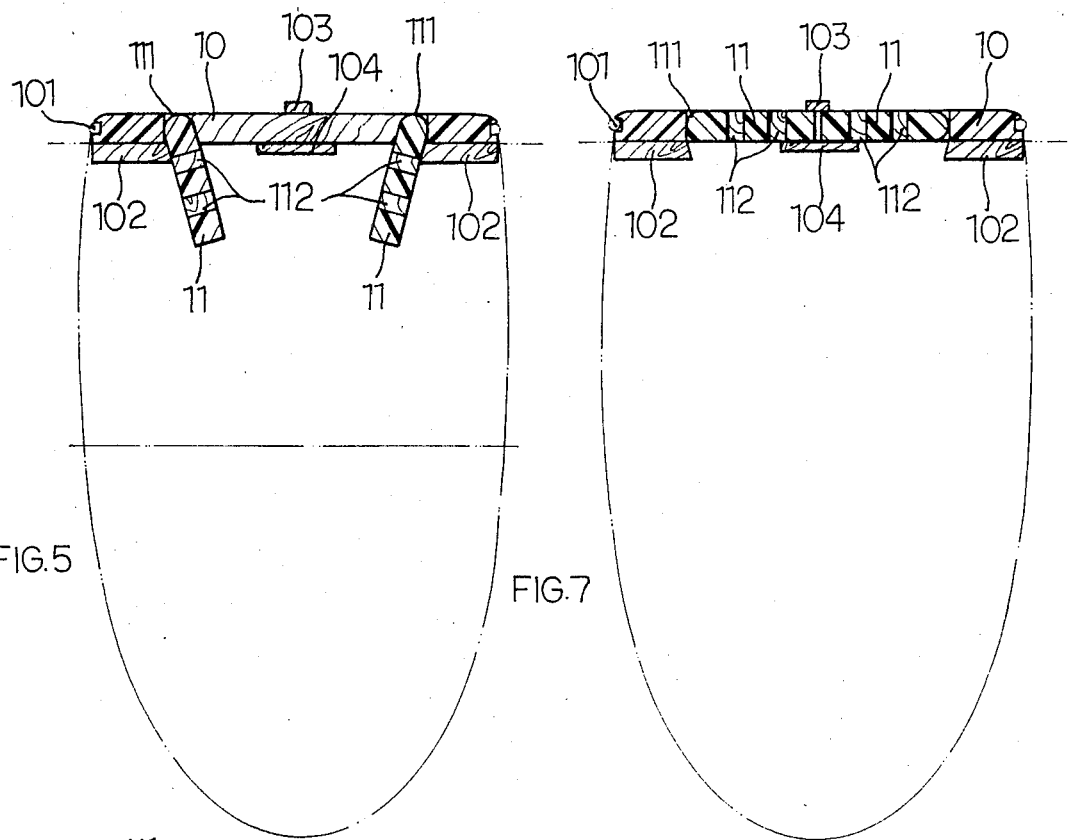
FIG. 5 is an illustration of the invention device as it is being taken off the water surface into which it has been submerged in floatation.
FIG. 7 is an illustration of the invention device as it is floating flat over the surface of water.

Referring to FIG. 1, FIG. 2, FIG. 3, and FIG. 4, it will be seen that the invention device comprises essentially a frame-type buoy top 10 subordinated by two grid ports on either side underneath. A coulee 101 is provided to enclose the frame-type buoy top 10 to accommodate fitting of the fish net hoop. On both sides of the bottom of the buoy top 10 are provided a fitting piece 102 sloped by 75 degrees habitually. On both the top and the bottom of the buoy top 10 are provided a mortise joint catch 103, 104, as shown in FIG. 3 FIG. 4. The top end of either of the two self-complementary grid ports 11 is formed semi-spherically 111, on the grid port 11 are provided a number of oblong seepage holes 112. The grid port 11 itself is fitted into position by fastening both ends by means of screws, for embodiment inside the buoy top framework 10, so as to form a movable fish net buoy top as shown in 1 and FIG. 2. Referring to FIG. 4, it is seen that the fitting pieces 102, sloped by 75 degrees in the habitual position, are present on both ends of the bottom of the buoy top framework 10, relative to the grid ports 11. These fitting pieces 102 function to bring the grid ports 11 inside the buoy top 10 to droop downwards as the mortise joint catch 104 at the bottom of the framework buoy top 10 is brought by rotation to a position in parallel with the open surface of the buoy top 10, causing the grid port 11 to decline by 75 degrees, as shown in FIG. 3.

Figures 6, 8:
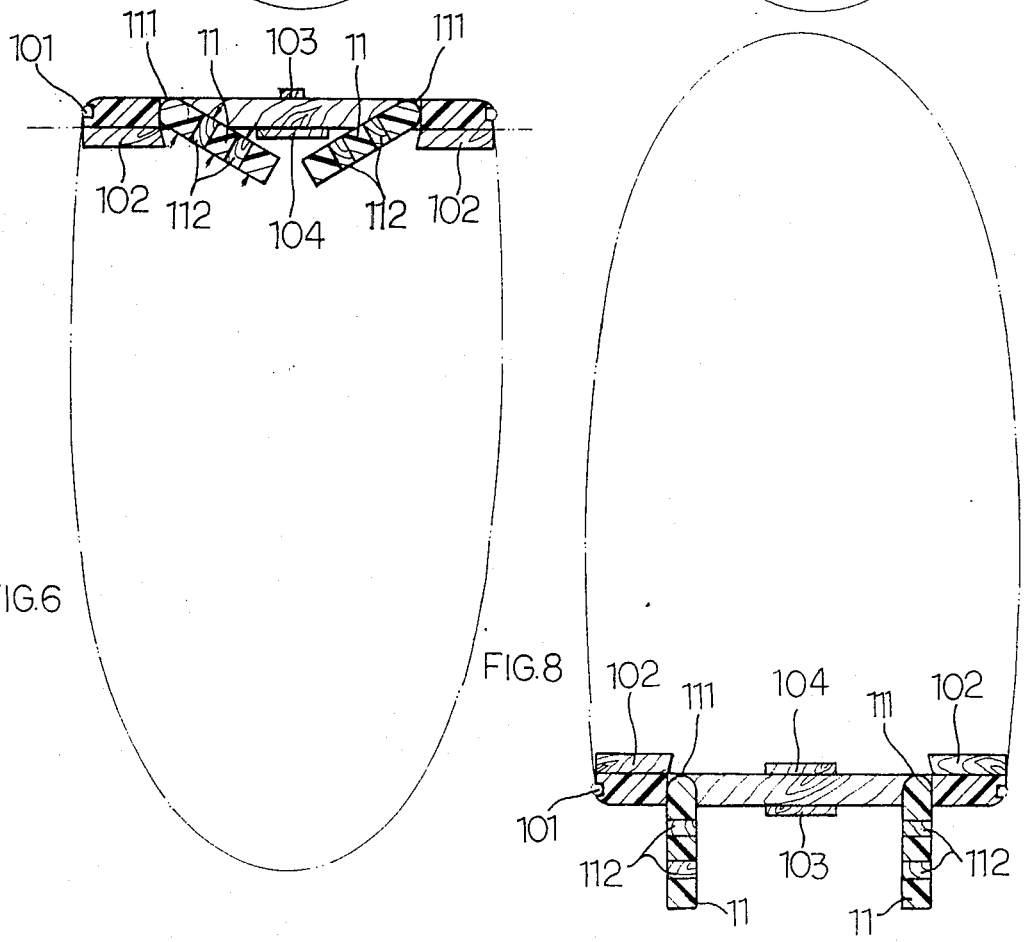
FIG. 6 is an illustration of the invention device as it is being submerged into water.
FIG. 8 is an illustration of the invention device as it is disposed top side down.

Referring to FIG. 5 and FIG. 6, it is seen that in use the invention device is fitted to the coulee 101 relative to the buoy top 10, the mortise joint catch 103 disposed on top of the buoy top 10 is rotated perpendicular to the open surface of the framework, and the mortise joint catch 104 at bottom is rotated parallel with the open surface of the framework, whereupon the grid port 11 embodied inside the buoy top 10 will flop down on both sides, as shown in FIG. 5. On the other hand the fish net to be submerged in the water, the grid port 11 will come up, owing to flotation as the movable buoy top comes into contact with water. The water expelled from the surface on the grid port 11 finds its way out via the oblong holes 112, as shown in FIG. 6, so that the grid port 11 can float up speedily, till it bears upon the mortise joint 103 on top of the strut. Thus each grid part 11 comes to closure, as shown in FIG. 7, then the catch captured and entrapped in the fish net can by no means flee from the fish net. This solves once and for all the trouble of picking up the cage and open the top manually, when the fisher has caught a new fish, in order to settle the catch temporarily in a safely captured state before setting out for home. Otherwise, when using conventional fish nets the fisher, on catching a fish for custody, all he has to do is just to pick up the cage off the surface of water to let the grid port 11 droops down, then put the fish into the cage, the cage laid down back into water, the fish is then in captivity in the cage, because in the meantime the grid port 11 will close up automatically owing to floatation. The operation is rather simple when the fisher later sets out for home, just requiring rotation of the mortise joint catch 104 at the bottom of the buoy top 10 to bear itself perpendicular to the open surface of the framework, making the grid port 11 restricted from drooping down bilaterally, for carrying it ashore from place to place.

By referring to FIG. 8, it is seen that if and when the fisher wants to pour the catch in the cage totally out, it is necessary to just give a rotation of the mortise joint catch 103 on top of the buoy top 10 to a position perpendicular to the open face of the framework, reverse to the fish net buoy top, whereupon the grid port 11 integral with the buoy top 10 will droop low owing to gravitation. This facilitates outpouring of the catch in the cage. In short, the invention provides for a perfect movable fish net buoy top that is easy to operate, to carry along, and most importantly, which permits convenient and easy loading for temporary custody of the catch, and unloading for further disposal on shore, of the catch.

Figure 9:
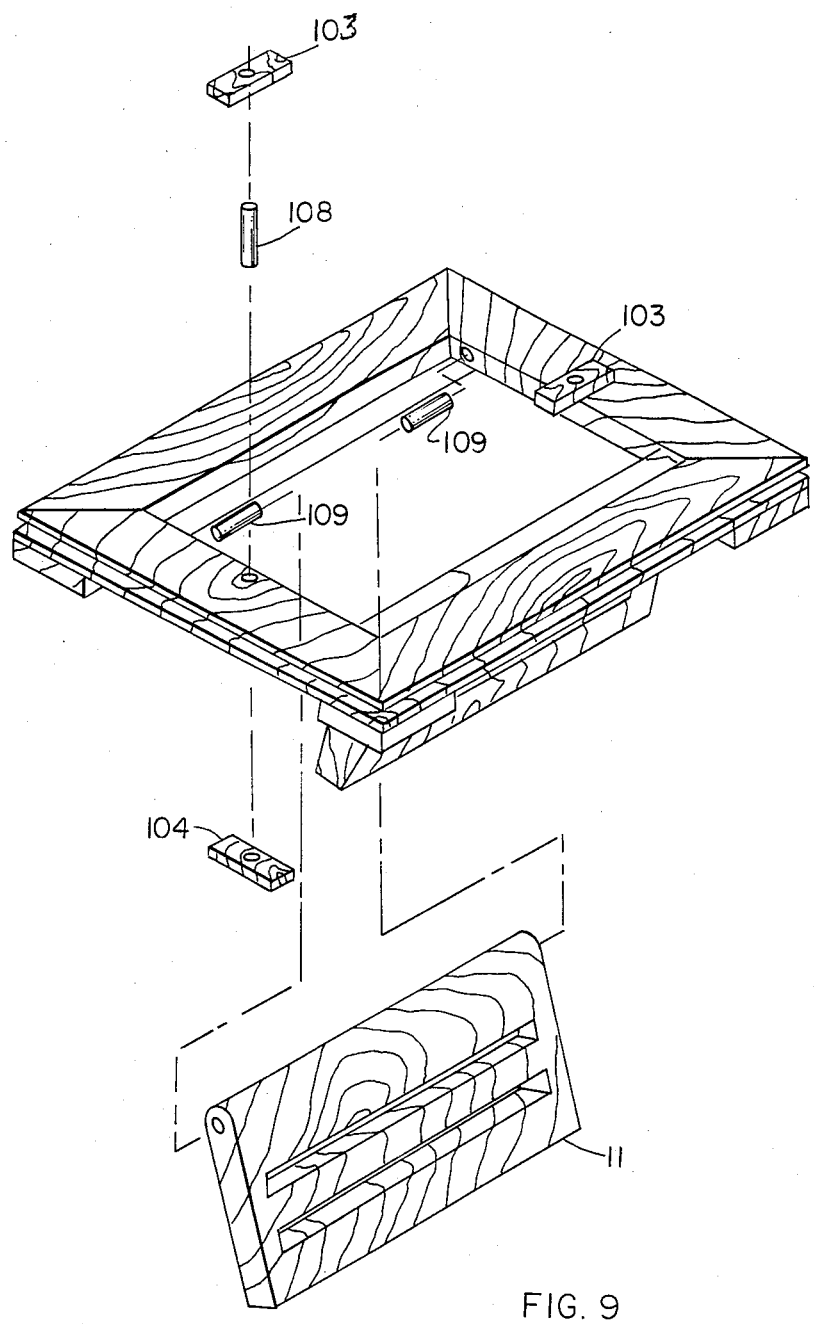
FIG. 9 is an illustration showing details of the invention device.

FIG. 9 shows the tendon 108 of the mortise joint catches 103 and 104 disposed on the top and bottom fo the buoy top 10, as indicated in FIGS. 1-2. Also shown are tendon 109 for rotatably supporting grid parts 11, as indicated but hidden from view in FIG. 3, for rotation upward and downward as in FIGS. 5 and 8.

In view of the invention device's unique features, any and all known and existing like products anywhere known to date, of its excellent improvements by comparison with conventional fish net structures, it is deemed a truly worthwhile and effective piece of invention which should justify the claims for a patent.

I claim:

1. A movable fish net buoy top, comprising, a cage having a framework representing the buoy top, the buoy top having two pivotal grid ports, each said grid port fitting inside the framework buoy top and being provided with a number of oblong holes, said grid port being deflectable by 90 degrees upwards and 75 degrees downwards, a groove being provided around the perimeter of the buoy top to accommodate coupling with the fish net, a pair of fitting pieces on each of the sides on the bottom of the cage having opposed surfaces declining by 75 degrees, means provided at the bottom and at the top of the framework of the buoy top for fastening the two grid ports in a closed position, said means being rotatably secured by mortise joint catches whereby the subject device is placed in water for use and the grid ports will open when the structure is lifted to permit entrance of new catch within for temporary custody, and close by itself by virtue of the floatation of the grid ports as the cage is again lowered into the water, and the catch safely held within for subsequent removal to shore with ease and convenience.

* * * * *